US012786238B2

(12) United States Patent
Shum et al.

(10) Patent No.: US 12,786,238 B2
(45) Date of Patent: Nov. 3, 2026

(54) LEGITIMIZING TRUST IN PEER NETWORKS USING ARTIFICIAL INTELLIGENCE

(71) Applicant: INTERNATIONAL BUSINESS MACHINES CORPORATION, Armonk, NY (US)

(72) Inventors: Stephanie Carys Shum, Wappingers Falls, NY (US); Andrew C. M. Hicks, Highland, NY (US); Daniel Nicolas Gisolfi, Hopewell Junction, NY (US); Anthony Gennaro Mangiacapra, Vestal, NY (US); Marcos Araque Fiallos, Elmwood Park, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/647,975

(22) Filed: Apr. 26, 2024

(65) Prior Publication Data

US 2025/0335612 A1 Oct. 30, 2025

(51) Int. Cl.
*H04L 9/40* (2022.01)

(52) U.S. Cl.
CPC .................................... *H04L 63/20* (2013.01)

(58) Field of Classification Search
CPC ............. H04L 63/08; H04L 63/10–108; H04L 63/14–1425; H04L 63/1441; H04L 63/20–205
See application file for complete search history.

(56) References Cited

U.S. PATENT DOCUMENTS

| | | | |
|---|---|---|---|
| 10,397,364 B2 | 8/2019 | Jayaram et al. | |
| 10,986,080 B1 | 4/2021 | Huang et al. | |
| 11,418,510 B2 | 8/2022 | Lai et al. | |
| 11,824,970 B2 | 11/2023 | Padmanabhan | |
| 2020/0250747 A1 | 8/2020 | Padmanabhan | |
| 2021/0241241 A1 | 8/2021 | Lokanath | |
| 2021/0287209 A1 | 9/2021 | Nelluri | |
| 2021/0320797 A1* | 10/2021 | Koorella | H04L 9/50 |
| 2022/0006705 A1 | 1/2022 | Padmanabhan | |

(Continued)

FOREIGN PATENT DOCUMENTS

| | | |
|---|---|---|
| CN | 112615864 A | 4/2021 |
| CN | 113496349 A | 10/2021 |
| CN | 113918718 A | 1/2022 |

(Continued)

OTHER PUBLICATIONS

Bedrock, Bedrock Business Utility Governance Framework, https://bedrock-consortium.github.io/bbu-gf/, printed Jan. 30, 2024, 1 page.

(Continued)

*Primary Examiner* — Kevin Bechtel
(74) *Attorney, Agent, or Firm* — Onyx IP Group

(57) ABSTRACT

Legitimizing trust in peer networks using artificial intelligence, including: calculating, by an overseer, a trustworthiness score of an untrusted node of a peer network comprising a plurality of nodes, wherein the trustworthiness score is based on activity of the untrusted node in the peer network; and restricting participation in the peer network by the untrusted node based on the untrusted node being flagged as untrusted.

25 Claims, 8 Drawing Sheets

(56) References Cited

U.S. PATENT DOCUMENTS

2022/0092056 A1 3/2022 Sekar et al.

FOREIGN PATENT DOCUMENTS

| | | | |
|---|---|---|---|
| CN | 115577701 | B | 9/2023 |
| CN | 114553437 | B | 12/2023 |
| WO | 2020222125 | A1 | 11/2020 |

OTHER PUBLICATIONS

IBM, IBM and SecureKey Technologies to Deliver Blockchain-Based Digital Identity Network for Consumers, PR Newswire, https://www.prnewswire.com/news-releases/IBM-and-securekey-technologies-to-deliver-blockchain-based-digital-identity-network-for-consumers-300425919.html, dated Mar. 20, 2017, 3 pages.

Nassar et al., Blockchain for explainable and trustworthy artificial intelligence, Wiley, Wiley Periodicals, Inc., WIREs Data Mining Knowl Discov. 2020; 10:e1340, DOI:10.1002/widm.1340, Oct. 2019, 13 pages.

Wallach et al., An Agile Ethical/Legal Model for the International and National Governance of AI Robotics, Association for the Advancement of Artificial Intelligence (www.aaao.org), https://www.aies-conference.com/2018/contents/papers/main/AIES_2018_paper_77.pdf, 2017, 7 pages.

Wang et al., The Applications of Blockchain in Artificial intelligence, Wiley, Hindawi, Security and Communications Networks, vol. 2021, Article ID 6126247, https://doi.org/10.1155/2021/6126247, Published Sep. 28, 2021, 16 pages.

* cited by examiner

LEGITIMIZING TRUST IN PEER NETWORKS USING ARTIFICIAL INTELLIGENCE

BACKGROUND

The present disclosure relates to methods, apparatus, and products for legitimizing trust in peer networks using artificial intelligence. Peer networks may be used in various systems to allow multiple entities to engage in coordinated and/or distributed activity. Trust in the members of a peer network is essential in ensuring that the members of the peer network do not engage in activity against the goals or objectives of the peer network. Various approaches address the vetting of new members to the peer network but lack the ability to prove a new member's trust on a user-to-user basis.

SUMMARY

According to embodiments of the present disclosure, various methods, apparatus and products for legitimizing trust in peer networks using artificial intelligence are described herein. In some aspects, legitimizing trust in peer networks using artificial intelligence includes calculating, by an overseer, a trustworthiness score of an untrusted node of a peer network comprising a plurality of nodes, wherein the trustworthiness score is based on activity of the untrusted node in the peer network; and restricting participation in the peer network by the untrusted node based on the untrusted node being flagged as untrusted. This provides the advantage of using an overseer to ensure that activity in the peer network meets the goals and objectives of the peer network. In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

In some aspects, this method may include designating the untrusted node as a trusted node in response to the trustworthiness score exceeding a threshold. This provides the advantage of previously untrusted nodes to be redesignated as trusted where their activity over time indicates adherence to the goals of the peer network.

In some aspects, this method may include adding, in response to a request to add a node to the peer network, the node as an untrusted node. This provides the advantage of having newly added nodes to begin as untrusted nodes, reducing the risk posed by newly added nodes to the peer network.

In some aspects, this method may include adding, in response to the request to add the node to the peer network, a bot node to the peer network. This allows for voting activity for new, untrusted nodes, to be countered by bots to prevent a takeover of voting activity by an influx of new nodes in the peer network.

In some aspects, wherein calculating the trustworthiness score of the untrusted node comprises calculating the trustworthiness score of the untrusted node based on trustworthiness of one or more other nodes with which the untrusted node has interacted. This provides the advantage of having trustworthiness scores that reflect not only the activity of a given node, but also the trustworthiness of those nodes with which the given node has interacted.

DETAILED DESCRIPTION

Peer networks may be used in various systems to allow multiple entities to engage in coordinated and/or distributed activity. Trust in the members of a peer network is essential in ensuring that the members of the peer network do not engage in activity against the goals or objectives of the peer network. Various approaches address the vetting of new members to the peer network but lack the ability to prove a new member's trust on a user-to-user basis. Moreover, these approaches do not address the activity or trustworthiness of members after being admitted to the peer network, leaving such networks vulnerable to malicious actors who pass the initial vetting process.

Figure 1:
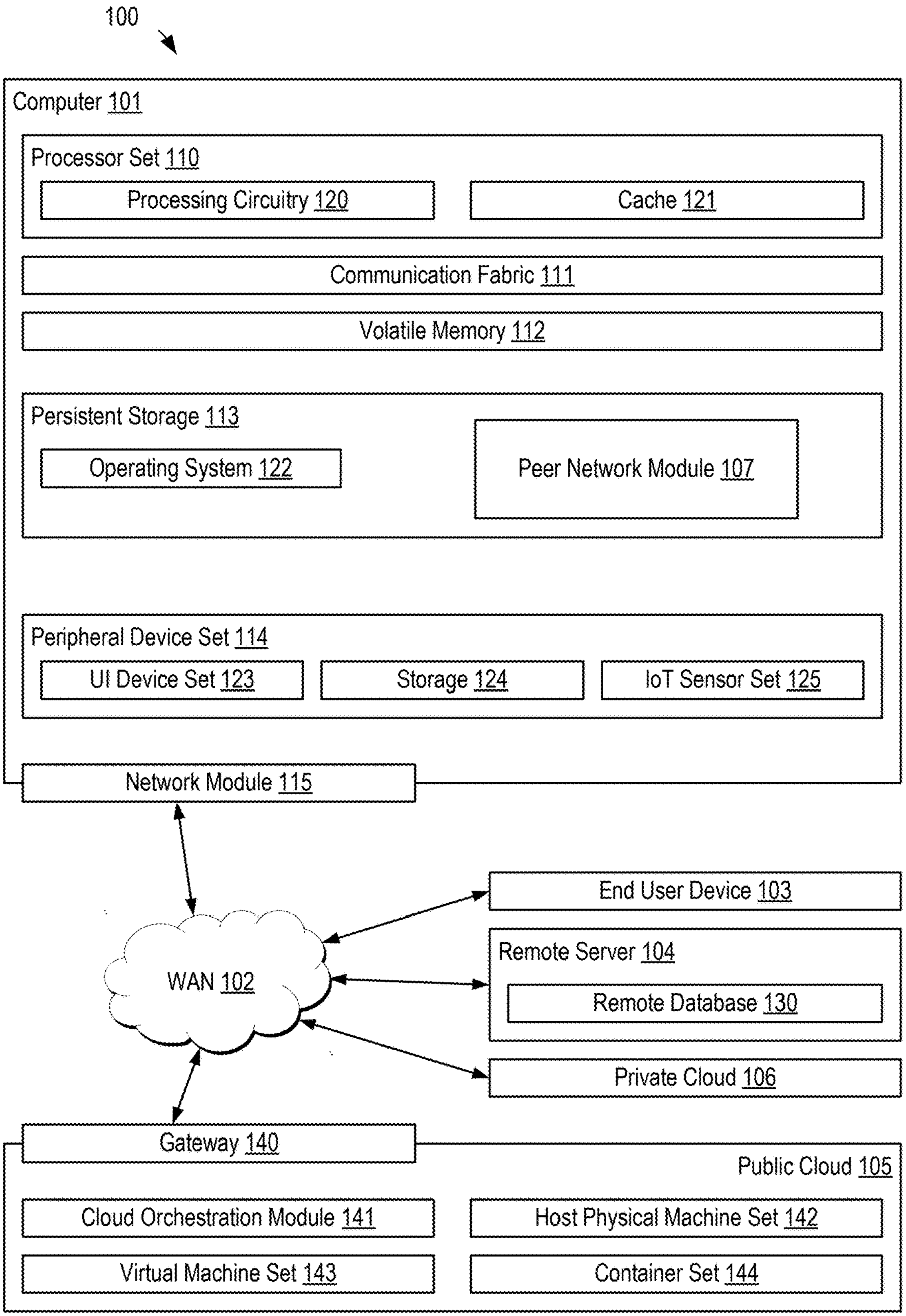
FIG. 1 sets forth a diagram of an example computing environment for legitimizing trust in peer networks using artificial intelligence in accordance with some embodiments of the present disclosure.

With reference now to FIG. 1, shown is an example computing environment according to aspects of the present disclosure. Computing environment 100 contains an example of an environment for the execution of at least some of the computer code involved in performing the various methods described herein, such as peer network module 107. In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI)

device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
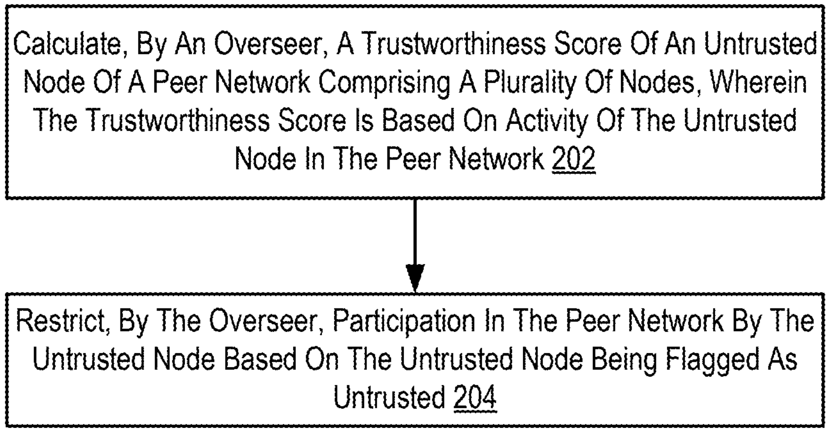
FIG. 2 sets forth a flowchart of an example method of legitimizing trust in peer networks using artificial intelligence in accordance with some embodiments of the present disclosure.

For further explanation, FIG. 2 sets forth a flowchart of an example method of legitimizing trust in peer networks using artificial intelligence according to some embodiments of the present disclosure. The method of FIG. 2 may be performed, for example, by the peer network module 107 of FIG. 1. The method of FIG. 2 includes calculating 202, by an overseer, a trustworthiness score of an untrusted node of a peer network comprising a plurality of nodes, wherein the trustworthiness score is based on activity of the untrusted node in the peer network. The peer network includes multiple intercommunicating entities (e.g., "nodes") which may include one or more nodes that created or established the peer network (e.g., "primogenitors") and potentially one or more nodes added after creation of the peer network. The primogenitors may have particular privileges different than other members of the peer network, including other trusted nodes described below. For example, the primogenitors may have permission to add or remove nodes from the peer network. As another example, the primogenitors may have permissions to create mandates, update overseers, and the like. As a further example, primogenitors may have permissions to modify designations of nodes as trusted or untrusted.

The peer network may include a variety of peer networks as can be appreciated, including permissioned or permissionless peer networks. For example, in some embodiments, the peer network may include a distributed ledger technology (DLT) platform. As another example, in some embodiments, the peer network may include a network of nodes controlling operation of a mainframe or other computing system by proposing and voting on particular actions to be implemented in the mainframe or system. As a further example, in some embodiments, the peer network may include a network of developers or other users of a code repository whereby users can submit actions to be performed with respect to the code repository (e.g., a pull request or code commit) that may then be voted on for approval by the other members of the peer network before being implemented. Other types of peer networks are also contemplated within the scope of the present disclosure.

Particularly, the peer network may include a network of nodes whereby particular actions by particular nodes and/or with respect to the network may be voted on by the member nodes. The member nodes of the peer network may include both trusted and untrusted nodes. In other words, each node in the peer network may be flagged as trusted or untrusted. As will be described in further detail below, participation in the peer network may be restricted for untrusted nodes until they are escalated to a trusted state. Accordingly, the peer network may include a set of trusted nodes (e.g., a "syndicate") that may trigger creation of overseer instances. The peer network may include a "consortium" that includes all trusted and untrusted nodes, including any bot nodes to be described in further detail below.

The overseer is a program executed by one or more of the nodes in the peer network that acts to uphold the goals or objectives of the peer network. The overseer may include, for example, a trained neural network such as a feed forward neural network, another machine learning model, or another program or module as can be appreciated. In some embodiments, the particular algorithm(s) used by the mandate may be defined and/or agreed upon by the primogenitors as part of creating the peer network. To uphold the goals or objectives of the peer network, the overseer upholds one or more mandates defining these goals or objectives. In some embodiments, the one or more mandates may include one or more rules, sets of actions, sequences of actions, and the like deemed as permissible or impermissible by the overseer. As an example, the one or more mandates may define a threshold amount of time after which a pull request may be approved or voted on for approval. As another example, the one or more mandates may define particular actions in a mainframe or computing system that may be deemed disruptive and therefore subject to a vote before being implemented. As a further example, the one or more mandates may define voting thresholds (e.g., other than a majority threshold), such as when implementing DLT networks. Other mandates are also contemplated within the scope of the present disclosure.

In some embodiments, such as where the overseer is implemented as a trained model, the one or more mandates may be based on trends or other activity reflected in historical voting data. For example, in some embodiments, the overseer may be trained using historical voting data to identify optimal voting activity for particular users that would meet the goals or objectives of the peer network. Accordingly, when an election occurs in the peer network, the overseer may be trained to generate a vote for that election based on the historical voting data. The vote generated by the overseer, which may or may not be included in the overall vote total for the election, may serve as a mandate. Thus, any votes that contradict the vote of the overseer may be deemed to contradict or violate that mandate.

In some embodiments, the overseer may be executed by any node in the peer network. In some embodiments, instances of the overseer may be executed in the peer network by distributing and executing a compiled binary of the overseer to prevent modification of the underlying code. In some embodiments, the compiled binaries may have a known checksum used to validate instances of the overseer in the peer network, further ensuring the integrity of the overseer. Readers will appreciate that, in some embodiments, as goals of the peer network change or as operational needs change, the overseer may be updated (e.g., by updating the underlying algorithm and/or mandates) and distributed throughout the peer network as necessary, thereby deprecating previous versions of the overseer.

As is set forth above, the overseer calculates 202 a trustworthiness score of an untrusted node in the peer network. The trustworthiness score of a given node in the peer network is a quantitative evaluation of the degree to which the given node should be considered trusted or untrusted. In some embodiments, the trustworthiness score of the given node may be based on voting patterns of the given node as reflected in monitored activity of the given node. In other words, the trustworthiness score for the untrusted node may be calculated 202 as a function of voting activity described in the activity of the untrusted node. For example, the trustworthiness score of the given node may be based on a degree to which voting activity of the given node diverges from voting activity for trusted nodes in the peer network. Thus, a node that tends to vote consistent with the trusted nodes in the peer network may be assigned a higher trustworthiness score over time while a node whose votes diverge from the trusted nodes in the peer network may be assigned a lower trustworthiness score over time. Readers will appreciate that the trustworthiness score for a given node reflects some aggregation of activity in the peer network over time. Accordingly, the trustworthiness score for the given node may vary over time as voting activity or other activity accrues. For example, in some embodiments, more recent activity may affect the trustworthiness score of a given node more significantly than older activity such that the trustworthiness score more accurately reflects the current trustworthiness of the given node. As another example, the trustworthiness score for a given node may be based on a sliding time window of activity.

In some embodiments, the trustworthiness score for a given node may be calculated using activity other than or in addition to voting activity. For example, activity of the given node may be compared to the one or more mandates enforced by the overseer. Where activity of the given node violates or contradicts a given mandate, this may result in a lower trustworthiness score for the given node. As another example, where activity of the given node adheres to some mandate, this may result in a higher trustworthiness score for the given node.

Here, the overseer calculates 202 the trustworthiness score of the untrusted node. In some embodiments, the overseer may calculate the trustworthiness score of multiple untrusted nodes including the untrusted node. In some embodiments, the overseer may also calculate trustworthiness scores for one or more of the trusted nodes. As will be described in further detail below, the untrusted node may be designated a trusted node where the trustworthiness score exceeds some threshold.

The method of FIG. 2 also includes restricting 204 participation in the peer network by the untrusted node based on the untrusted node being flagged as untrusted. In some embodiments, in the peer network may be restricted, for example, by an access control or regulation system that may require nodes to be trusted in order to perform some actions. In other words, participation in the peer network may differ between trusted nodes and untrusted nodes. For example, in some embodiments, actions proposed or requested by untrusted nodes may be automatically rejected. As another example, the actions that may be proposed or requested by an untrusted node may be restricted to a particular subset of actions. As will be described in further detail below, in some embodiments, votes of untrusted nodes may be automatically countered when a vote is performed in the peer network. Put differently, participation in the peer network by the untrusted node may be restricted by restricting actions that may be requested or proposed by the untrusted node, by restricting voting activity by the untrusted node, or combinations thereof.

The approaches set forth above allow for an overseer, such as an artificial intelligence (AI)-enabled overseer to enforce objectives in a peer network, preventing malicious or compromising activity that may be counter to the goals of the network. Moreover, the approaches set forth above provide for activity restrictions for untrusted nodes, preventing potentially malicious nodes added to the network from compromising or taking over the peer network.

Figure 3:
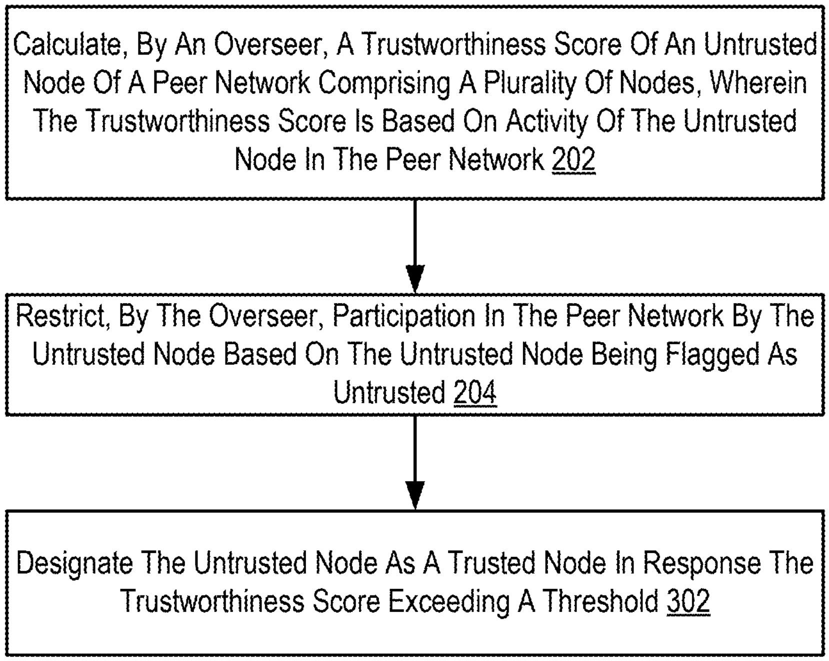
FIG. 3 sets forth a flowchart of another example method of legitimizing trust in peer networks using artificial intelligence in accordance with some embodiments of the present disclosure.

For further explanation, FIG. 3 sets forth a flowchart of another example method of legitimizing trust in peer networks using artificial intelligence in accordance with some embodiments of the present disclosure. The method of FIG. 3 is similar to FIG. 2 in that the method of FIG. 3 also includes calculating 202, by an overseer, a trustworthiness score of an untrusted node of a peer network comprising a plurality of nodes, wherein the trustworthiness score is based on activity of the untrusted node in the peer network; and restricting 204, by the overseer, participation in the peer network by the untrusted node based on the untrusted node being flagged as untrusted.

The method of FIG. 3 differs from FIG. 2 in that the method of FIG. 3 also includes designating 302 the untrusted node as a trusted node in response to the trustworthiness score exceeding a threshold. In some embodiments, the threshold may be defined in the one or more mandates of the overseer. In some embodiments, the threshold may be otherwise predefined. In some embodiments, the threshold may be dynamically calculated or variable based on the respective trustworthiness scores of other nodes in the peer network. In some embodiments, the untrusted node may be designated as trusted in response to the trustworthiness score exceeding the threshold after some amount of time. In some embodiments, as will be described in further detail below, overseer instances and/or bot nodes added to the peer network in response to the previously untrusted node being added to the peer network may be removed when the previously untrusted node is designated as trusted.

By designating 302 the untrusted node as a trusted node, untrusted nodes may be escalated to trusted where their voting activity and/or other activity has shown to be in line with the other trusted nodes on the network. This prevents full participation in the peer network until the untrusted node has proven to be trusted. Accordingly, after being designated 302 as untrusted, restrictions previously applied to untrusted nodes will no longer be applied to the newly trusted node.

Figure 4:
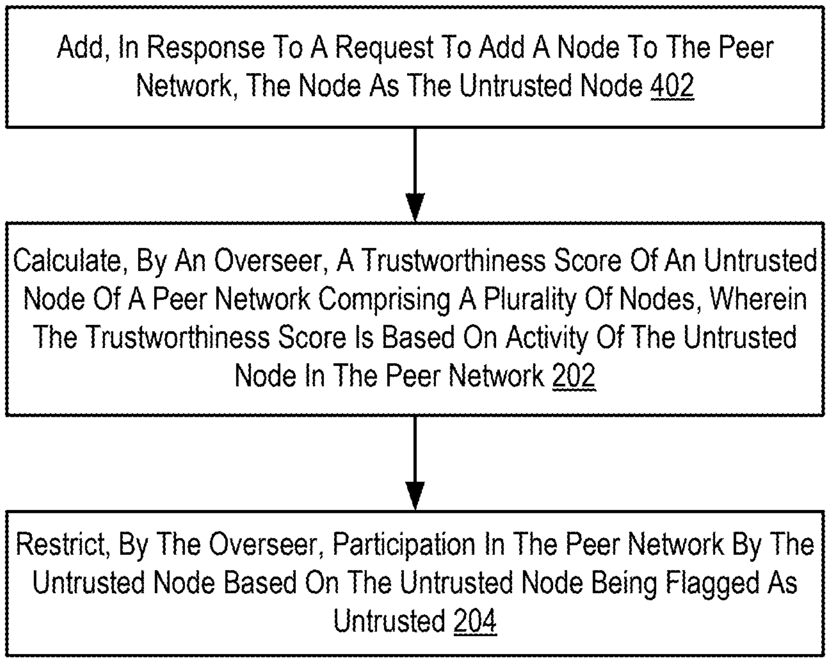
FIG. 4 sets forth a flowchart of another example method of legitimizing trust in peer networks using artificial intelligence in accordance with some embodiments of the present disclosure.

For further explanation, FIG. 4 sets forth a flowchart of another example method of legitimizing trust in peer networks using artificial intelligence in accordance with some embodiments of the present disclosure. The method of FIG. 4 is similar to FIG. 2 in that the method of FIG. 4 also includes calculating 202, by an overseer, a trustworthiness score of an untrusted node of a peer network comprising a plurality of nodes, wherein the trustworthiness score is based on activity of the untrusted node in the peer network; and restricting 204, by the overseer, participation in the peer network by the untrusted node based on the untrusted node being flagged as untrusted.

The method of FIG. 4 differs from FIG. 2 in that the method of FIG. 4 also includes adding 402, in response to a request to add a node to the peer network, the node as the untrusted node. Particularly, in some embodiments, any newly added node to the peer network is automatically added as an untrusted node, thereby subject to various activity restrictions. Moreover, in some embodiments, adding 402 the node as an untrusted node may include distributing and/or executing an overseer instance to monitor the newly added untrusted node. This prevents a sudden influx of newly added nodes from compromising the peer network. Once these newly added nodes have proven themselves as trustworthy over time due to their voting activity, they may then be escalated to being trusted nodes.

In some embodiments, a newly added untrusted node may be assigned some default trustworthiness score. In such embodiments, this default trustworthiness score may be modified as activity by the untrusted node occurs in the peer network. Thus, the trustworthiness score may be periodically updated until some threshold is reached (e.g., higher than the default trustworthiness score) whereby this newly added node may be designated as a trusted node.

Figure 5:
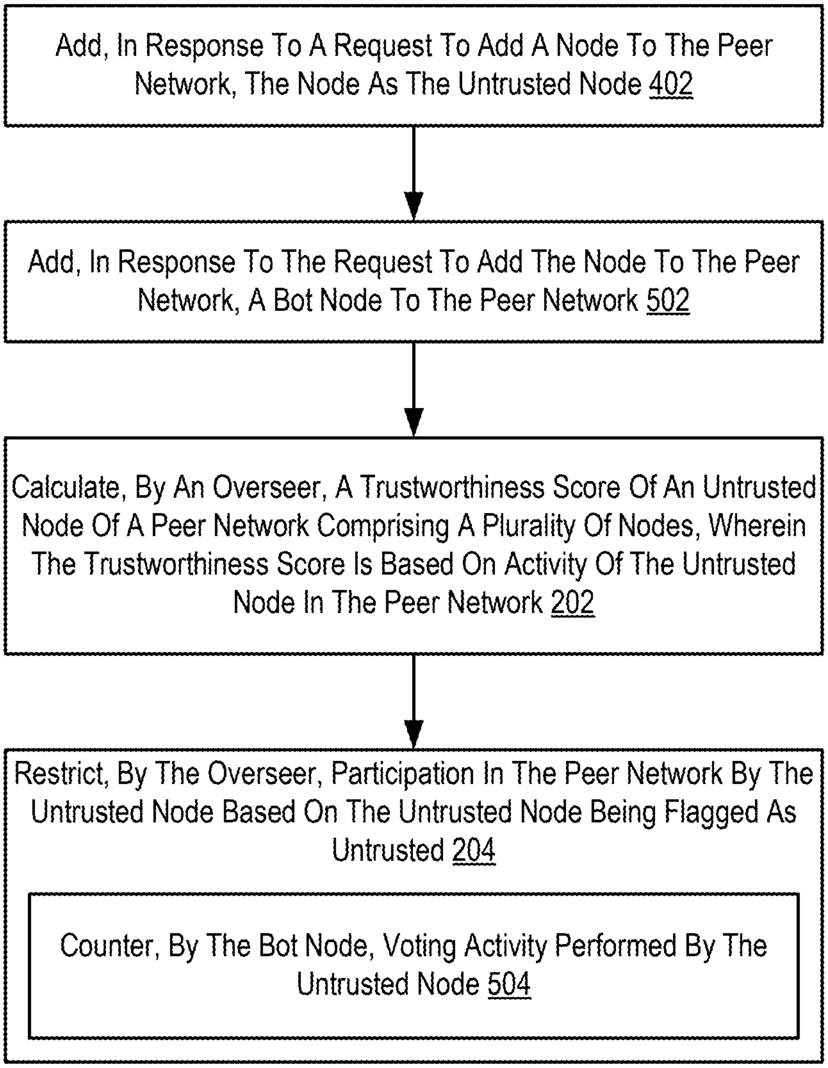
FIG. 5 sets forth a flowchart of another example method of legitimizing trust in peer networks using artificial intelligence in accordance with some embodiments of the present disclosure.

For further explanation, FIG. 5 sets forth a flowchart of another example method of legitimizing trust in peer networks using artificial intelligence in accordance with some embodiments of the present disclosure. The method of FIG. 5 is similar to FIG. 4 in that the method of FIG. 5 also includes adding 402, in response to a request to add a node to the peer network, the node as the untrusted node; calculating 202, by an overseer, a trustworthiness score of an untrusted node of a peer network comprising a plurality of nodes, wherein the trustworthiness score is based on activity of the untrusted node in the peer network; and restricting 204, by the overseer, participation in the peer network by the untrusted node based on the untrusted node being flagged as untrusted.

The method of FIG. 5 differs from FIG. 4 in that the method of FIG. 5 also includes adding 502, in response to the request to add the node to the peer network, a bot node to the peer network. In other words, in some embodiments, for each newly added untrusted node, a corresponding bot node may be executed. A bot node is a node that may participate in the peer network but whose actions are automatically controlled or defined. For example, in some embodiments, restricting 204 participation in the peer network by an untrusted node of the plurality of nodes based on the untrusted node being flagged as untrusted may include countering 504, by the bot node, voting activity performed by the untrusted node.

In some embodiments, where the untrusted node is requesting or proposing some action in the peer network, countering 504 the voting activity performed by the untrusted node may include automatically voting against that proposed action. In some embodiments, where the untrusted node issues a vote in some election in the peer network, countering 504 the voting activity performed by the untrusted node may include automatically voting contrary to the vote of the untrusted node, effectively canceling the vote of the untrusted node. In some embodiments, where a given untrusted node is subsequently designated as trusted, the corresponding bot node may be removed from the peer network.

The approaches set forth above particularly address concerns related to attacks that may be enabled by a large number of coordinated, untrusted nodes in the network, particularly a sudden influx of coordinated nodes. In some existing peer networks, a large enough influx of newly added nodes to a peer network may gain a majority share of the votes in the peer network, effectively allowing these newly added nodes to take control of the peer network (e.g., in a fifty-one percent attack). Here, each of these newly added nodes would be added to the peer network as untrusted nodes along with corresponding bot nodes. Even if these newly added nodes made up more than fifty percent of the total, non-bot nodes and decided to vote in a coordinated fashion they alone would not achieve a majority voting share due to their votes being canceled out by the newly added bot nodes.

Figure 6:
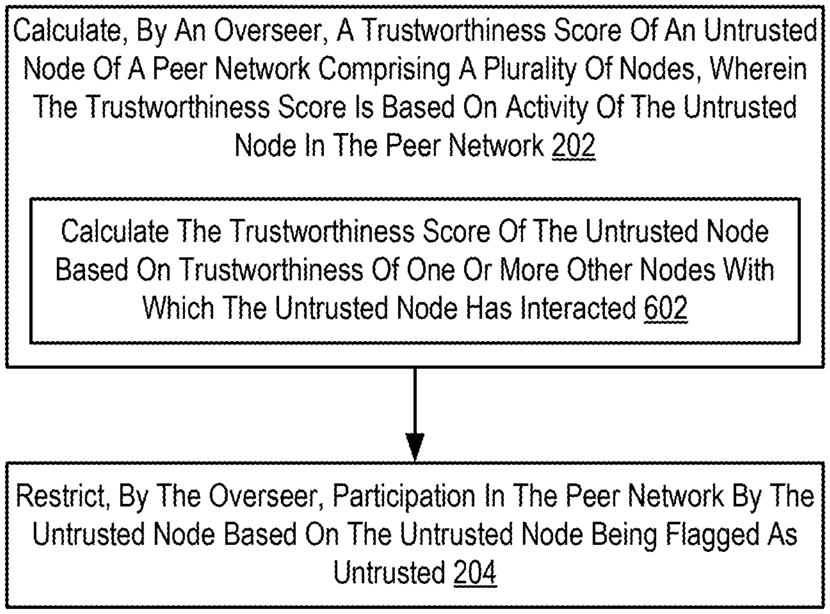
FIG. 6 sets forth a flowchart of another example method of legitimizing trust in peer networks using artificial intelligence in accordance with some embodiments of the present disclosure.

For further explanation, FIG. 6 sets forth a flowchart of another example method of legitimizing trust in peer networks using artificial intelligence in accordance with some embodiments of the present disclosure. The method of FIG. 6 is similar to FIG. 2 in that the method of FIG. 6 also includes calculating 202, by an overseer, a trustworthiness score of an untrusted node of a peer network comprising a plurality of nodes, wherein the trustworthiness score is based on activity of the untrusted node in the peer network; and restricting 204, by the overseer, participation in the peer network by the untrusted node based on the untrusted node being flagged as untrusted.

The method of FIG. 6 differs from FIG. 2 in that calculating 202, by the overseer, a trustworthiness score of the untrusted node based on the activity of the untrusted node in the peer network also includes calculating 602 the trustworthiness score of the untrusted node based on trustworthiness of one or more other nodes with which the untrusted node has interacted. A given node may be considered to have interacted with another node where both nodes are involved in the same action or activity. As an example, in the context of a code repository, where a given node issues a pull request and another node approves that pull request, those nodes may be considered to have interacted. As another example, where a given node creates some task to be completed and another node accepts that task for completion, those nodes may be considered to have interacted. The various interactions between nodes may be embodied as a graph or "endorsement tree," which may be directed, undirected, cyclic, or acyclic.

In this example, the trustworthiness score of a given node (e.g., the untrusted node) may be affected by the trustworthiness of another node if they have interacted. As an example, assuming a given node has interacted with another node, in some embodiments, the trustworthiness score of the given node may be calculated as a function of the trustworthiness score of the other node. As another example, the trustworthiness score of the given node may be calculated as a function of whether the other node has been flagged as a trusted or untrusted node.

In some embodiments, the trustworthiness score of the given node may be based on a degree to which the given node interacts with the other node. For example, where the given node has a high degree of interaction with an untrusted node, this may have a greater negative impact on the trustworthiness score of the given node compared to having a low degree of interaction. As another example, where the given node has a low degree of interaction with a trusted node, this may have a lesser positive impact on the trustworthiness score of the given node compared to having a high degree of interaction.

The approaches set forth herein allow for the activity of related nodes to affect the trustworthiness of the related nodes. For example, assume that a given node has a low trustworthiness due to a history of submitting poor quality code to a code base. Further assume that another node has repeatedly approved that code from the given node. Though the other node has itself not submitted the poor-quality code, its trustworthiness score may be negatively impacted due to having approved it.

Figure 7:
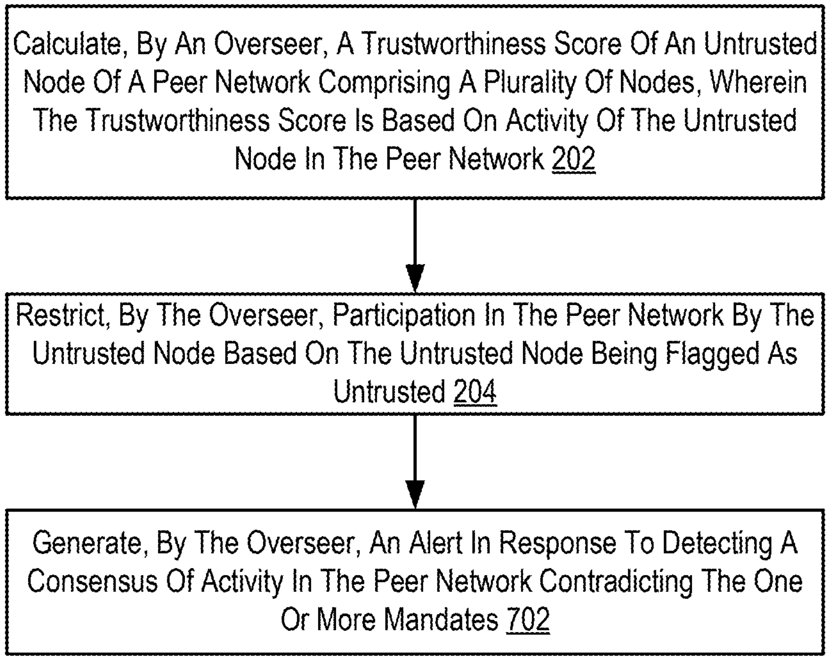
FIG. 7 sets forth a flowchart of another example method of legitimizing trust in peer networks using artificial intelligence in accordance with some embodiments of the present disclosure.

For further explanation, FIG. 7 sets forth a flowchart of another example method of legitimizing trust in peer networks using artificial intelligence in accordance with some embodiments of the present disclosure. The method of FIG. 7 is similar to FIG. 2 in that the method of FIG. 7 also includes calculating 202, by an overseer, a trustworthiness score of an untrusted node of a peer network comprising a plurality of nodes, wherein the trustworthiness score is based on activity of the untrusted node in the peer network; and restricting 204, by the overseer, participation in the peer network by the untrusted node based on the untrusted node being flagged as untrusted.

The method of FIG. 7 differs from FIG. 2 in that the method of FIG. 7 also includes: generating 702, by the overseer, an alert in response to detecting a consensus of activity in the peer network contradicting the one or more mandates. In some embodiments, the consensus may include a vote, from the consortium of the peer network, that contradicts the one or more mandates. For example, in some embodiments, the consensus may include a vote approving some action that violates a rule defined in the one or more mandates.

In some embodiments, where the overseer is a trained model, such a trained model may be trained using historical voting activity. Accordingly, a mandate may include, for a given election, a vote determined by the overseer. Such a vote reflects the goals and objectives of the peer network as determined by the overseer. Accordingly, where the consortium votes in contradiction with this overseer-determined vote, this may be deemed to be a contradiction of the mandate.

In some embodiments, the alert may include a notification or message sent to one or more members of the peer network. As an example, the alert may be sent to the primogenitors of the peer network, a syndicate of the peer network (e.g., the trusted nodes), or other members of the peer network as can be appreciated. This may be used for a variety of purposes. For example, this may serve to indicate, to members of the peer network, that the overseer may not accurately reflect the current objectives and goals of the peer network and may need to be updated. As another example, this may serve to merely inform those members that an action has been taken in contradiction with a mandate of the overseer. The alert may also facilitate or initiate other actions as can be appreciated.

Figure 8:
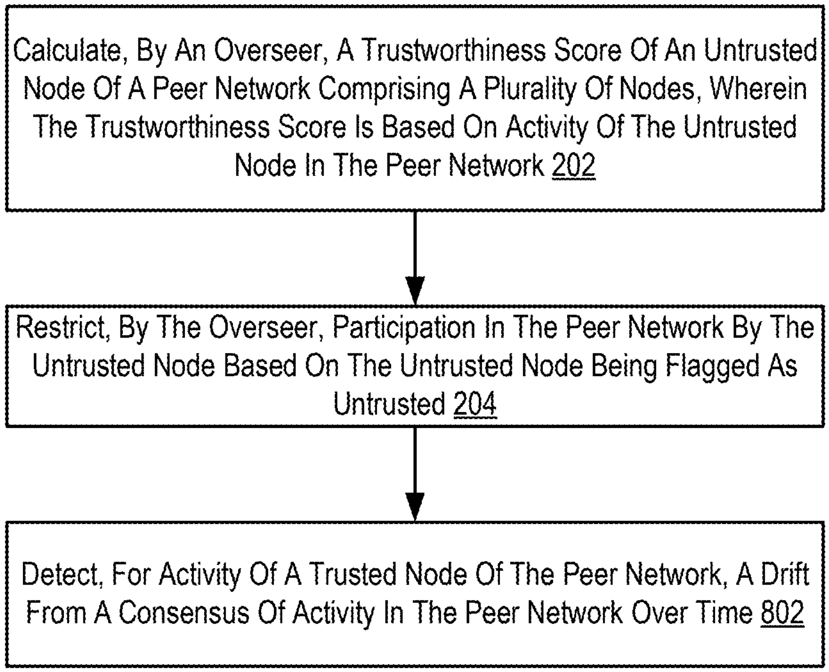
FIG. 8 sets forth a flowchart of another example method of legitimizing trust in peer networks using artificial intelligence in accordance with some embodiments of the present disclosure.

For further explanation, FIG. 8 sets forth a flowchart of another example method of legitimizing trust in peer networks using artificial intelligence in accordance with some embodiments of the present disclosure. The method of FIG. 8 is similar to FIG. 2 in that the method of FIG. 8 also includes calculating 202, by an overseer, a trustworthiness score of an untrusted node of a peer network comprising a plurality of nodes, wherein the trustworthiness score is based on activity of the untrusted node in the peer network;

and restricting 204, by the overseer, participation in the peer network by the untrusted node based on the untrusted node being flagged as untrusted.

The method of FIG. 8 differs from FIG. 2 in that the method of FIG. 8 also includes detecting 802, for activity of a trusted node of the peer network, a drift from a consensus of activity in the peer network over time. A drift in the activity of the trusted node indicates a trend on voting activity by the trusted node that diverges from the consensus reached by the syndicate (e.g., the trusted nodes) and/or peer network overall. For example, a trusted node may, over time, repeatedly vote in contradiction with the other trusted nodes in the syndicate. Where the voting trend for the trusted node diverges by some amount (e.g., having a deviation exceeding some threshold), a drift may be detected 802.

Various remedial actions may be taken in response to detecting 802 the drift in activity of the trusted node. For example, in some embodiments a bot may be deployed to counter voting activity of the trusted node or to further monitor and/or restrict the activity of the trusted node. As another example, in some embodiments, a notification may be sent to primogenitors of the peer network indicating that the activity of the trusted node has drifted, deferring to the primogenitors as to how to deal with the trusted node. In some embodiments, a trustworthiness score may be calculated or recalculated for the trusted node that, if below some threshold, may cause the trusted node to be designated an untrusted node and/or removed from the peer network entirely.

The approaches set forth above protect the peer network from trusted nodes whose activity may shift to being in contradiction of the peer network. This prevents, for example, attacks on the peer network by gaining status as a trusted node and abusing that status to perform potentially malicious activity.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

adding to a peer network, in response to a request to add a node to the peer network, the node as an untrusted node, wherein the node is flagged as untrusted upon being added to the peer network;

adding, in response to the request to add the node to the peer network, a bot node to the peer network;

calculating, by an overseer, a trustworthiness score of the untrusted node, wherein the trustworthiness score is based on activity of the untrusted node in the peer network; and restricting participation in the peer network by the node while the node is flagged as the untrusted node, wherein restricting participation comprises countering, by the bot node, voting activity performed by the node by automatically voting, by the bot node, contrary to a vote cast by the node while the node is flagged as the untrusted node.

2. The method of claim 1, wherein the trustworthiness score is further based on one or more mandates of the peer network.

3. The method of claim 1, further comprising designating the untrusted node as a trusted node in response to the trustworthiness score exceeding a threshold.

4. The method of claim 1, wherein the trustworthiness score of the untrusted node is based at least on a degree of deviation of the activity with other activity performed by trusted nodes in the peer network.

5. The method of claim 1, wherein calculating the trustworthiness score of the untrusted node comprises calculating the trustworthiness score of the untrusted node based on trustworthiness of one or more other nodes with which the untrusted node has interacted.

6. The method of claim 1, further comprising generating, by the overseer, an alert in response to detecting a consensus of activity in the peer network contradicting the one or more mandates.

7. The method of claim 1, further comprising detecting, for activity of a trusted node of the peer network, a drift from a consensus of activity in the peer network over time.

8. The method of claim 1, wherein the trustworthiness score is used to determine if the node is to be designated as a trusted node instead of an untrusted node.

9. The method of claim 1, wherein the trustworthiness score of the untrusted node is based at least on a degree of deviation of the activity with other activity performed by trusted nodes in the peer network.

10. The method of claim 1, wherein the trustworthiness score is further based on one or more mandates of the peer network.

11. The method of claim 10, further comprising generating, by the overseer, an alert in response to detecting a consensus of activity in the peer network contradicting the one or more mandates.

12. An apparatus comprising:
- a processing device; and
- memory operatively coupled to the processing device, wherein the memory stores computer program instructions that, when executed, cause the processing device to:
  - add to a peer network, in response to a request to add a node to the peer network, the node as an untrusted node;
  - add, in response to the request to add the node to the peer network, a bot node to the peer network;
  - calculate, by an overseer, a trustworthiness score of the untrusted node, wherein the trustworthiness score is based on activity of the untrusted node in the peer network; and
  - restrict participation in the peer network by the node while the node is flagged as untrusted,
  - wherein, to restrict participation, the computer program instructions, when executed, further cause the processing device to counter, by the bot node, voting activity performed by the node by automatically voting, by the bot node, contrary to a vote cast by the node while the node is flagged as the untrusted node.

13. The apparatus of claim 12, wherein the trustworthiness score is further based on one or more mandates of the peer network.

14. The apparatus of claim 12, wherein the computer program instructions, when executed, further cause the processing device to designate the untrusted node as a trusted node in response to the trustworthiness score exceeding a threshold.

15. The apparatus of claim 12, wherein, when the node is added as the untrusted node, the node is flagged as untrusted upon being added to the peer network.

16. The apparatus of claim 12, wherein the trustworthiness score of the untrusted node is based at least on a degree of deviation of the activity with other activity performed by trusted nodes in the peer network.

17. The apparatus of claim 12, wherein, to calculate the trustworthiness score of the untrusted node, the computer program instructions, when executed, further cause the processing device to calculate the trustworthiness score of the untrusted node based on trustworthiness of one or more other nodes with which the untrusted node has interacted.

18. The apparatus of claim 12, wherein the instructions, when executed, further cause the processing device to generate, by the overseer, an alert in response to detecting a consensus of activity in the peer network contradicting one or more mandates of the peer network.

19. The apparatus of claim 12, wherein the instructions, when executed, further cause the processing device to detect, for activity of a trusted node of the peer network, a drift from a consensus of activity in the peer network over time.

20. A computer program product comprising a computer readable storage medium, wherein the computer readable storage medium comprises computer program instructions that, when executed:
- add to a peer network, in response to a request to add a node to the peer network, the node as an untrusted node;
- add, in response to the request to add the node to the peer network, a bot node to the peer network;
- calculate, by an overseer, a trustworthiness score of the untrusted node, wherein the trustworthiness score is based on activity of the untrusted node in the peer network; and
- restrict participation in the peer network by the node while the node is flagged as untrusted,
- wherein, to restrict participation, the computer program instructions, when executed, further counter, by the bot node, voting activity performed by the node by automatically voting, by the bot node, contrary to a vote cast by the node while the node is flagged as the untrusted node.

21. The computer program product of claim 20, wherein the trustworthiness score is further based on one or more mandates of the peer network.

22. The computer program product of claim 20, wherein the computer program instructions, when executed, designate the untrusted node as a trusted node in response to the trustworthiness score exceeding a threshold.

23. The computer program product of claim 20, wherein the trustworthiness score of the untrusted node is based at least on a degree of deviation of the activity with other activity performed by trusted nodes in the peer network.

24. The computer program product of claim 20, wherein the trustworthiness score is further based on one or more mandates of the peer network.

25. The computer program product of claim 24, wherein the computer program instructions, when executed, generate, by the overseer, an alert in response to detecting a consensus of activity in the peer network contradicting the one or more mandates.

* * * * *